(12) United States Patent
Graham et al.

(10) Patent No.: US 10,951,053 B2
(45) Date of Patent: Mar. 16, 2021

(54) PORTABLE ELECTRONIC DEVICE

(71) Applicant: Apple Inc., Cupertino, CA (US)

(72) Inventors: Christopher S. Graham, San Francisco, CA (US); Karl Ruben F. Larsson, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 283 days.

(21) Appl. No.: 16/126,992

(22) Filed: Sep. 10, 2018

(65) Prior Publication Data
US 2020/0083736 A1 Mar. 12, 2020

(51) Int. Cl.
*H01M 10/46* (2006.01)
*H02J 7/02* (2016.01)
*H01F 27/34* (2006.01)
*H02J 50/10* (2016.01)

(52) U.S. Cl.
CPC ............ *H02J 7/025* (2013.01); *H01F 27/346* (2013.01); *H02J 50/10* (2016.02); *H01F 2027/348* (2013.01)

(58) Field of Classification Search
CPC .. H02J 50/10; H02J 7/355; H02J 50/12; H02J 50/005; H01F 2027/348; H01F 38/14; H01F 27/346
USPC ..................... 320/108; 336/221, 222, 229, 15
See application file for complete search history.

(56) References Cited

U.S. PATENT DOCUMENTS

| | | | |
|---|---|---|---|
| 5,991,155 A | 11/1999 | Kobayashi et al. | |
| 7,119,419 B2 | 10/2006 | Kato et al. | |
| 7,292,441 B2 | 11/2007 | Smalc et al. | |
| 7,583,834 B2 | 9/2009 | McCollough et al. | |
| 7,652,729 B2 | 1/2010 | Minaguchi et al. | |
| 7,760,289 B2 | 7/2010 | Nakanishi et al. | |
| 8,110,744 B2 | 2/2012 | Wong et al. | |
| 8,281,483 B2 | 10/2012 | Hofmann et al. | |
| 8,669,483 B2 | 3/2014 | Shimura et al. | |
| 8,740,634 B2 | 6/2014 | Uesaka et al. | |
| 8,762,749 B2 | 6/2014 | Azancot et al. | |
| 8,960,818 B2 | 2/2015 | Myers et al. | |
| 9,143,586 B2 | 9/2015 | Allore et al. | |
| 9,380,714 B2 | 6/2016 | Shin et al. | |
| 9,469,469 B2 | 10/2016 | Rayner | |
| 9,583,256 B2 | 2/2017 | Lapetina et al. | |
| 9,601,286 B2 | 3/2017 | Lynch et al. | |
| 9,973,013 B2 | 5/2018 | Yan | |
| 10,003,371 B1 | 6/2018 | Given et al. | |

(Continued)

FOREIGN PATENT DOCUMENTS

WO 2005048298 A2 5/2005

OTHER PUBLICATIONS

Gorilla University: Quantum Induction Wireless Charging (https://gorillagadgets.com/blogs/gorilla-gadgets-blog/qi-quantum-induction-wireless-charging).

(Continued)

*Primary Examiner* — Edward Tso
(74) *Attorney, Agent, or Firm* — Dickinson Wright RLLP

(57) ABSTRACT

An inductive coil capable of providing power to the battery is described. The inductive coil is formed of a length of a wire having a conductive core capable of carrying an electrical current. The conductive core is surrounded by an insulating layer that electrically isolates the conductive core. Portions of the length of wire include a magnetically permeable material that is plated on an exposed surface of the conductive core.

20 Claims, 9 Drawing Sheets

(56) References Cited

U.S. PATENT DOCUMENTS

| | | | |
|---|---|---|---|
| 10,218,830 B1 | 2/2019 | Liu et al. | |
| 2003/0066672 A1 | 4/2003 | Watchko et al. | |
| 2008/0151503 A1 | 6/2008 | Aapro et al. | |
| 2008/0164840 A1 | 7/2008 | Kato et al. | |
| 2010/0072952 A1 | 3/2010 | Nakajima | |
| 2012/0074899 A1* | 3/2012 | Tsai | H02J 7/025 320/108 |
| 2012/0234524 A1 | 9/2012 | Fan et al. | |
| 2013/0033581 A1 | 2/2013 | Woo et al. | |
| 2013/0199028 A1* | 8/2013 | Singh | A61N 1/37229 29/602.1 |
| 2014/0177197 A1 | 6/2014 | Lampinen | |
| 2014/0192467 A1 | 7/2014 | Kwong | |
| 2014/0367369 A1 | 12/2014 | Nashner et al. | |
| 2015/0111623 A1 | 4/2015 | Hegemier et al. | |
| 2015/0198864 A1 | 7/2015 | Havskjold et al. | |
| 2016/0012966 A1* | 1/2016 | Davis | H01F 38/14 307/104 |
| 2016/0225514 A1* | 8/2016 | Cheng | H01F 27/2866 |
| 2016/0372960 A1* | 12/2016 | Ritter | H02J 7/00304 |
| 2017/0085764 A1 | 3/2017 | Kim et al. | |
| 2017/0250578 A1* | 8/2017 | Kallman | H01F 27/266 |
| 2018/0053981 A1 | 2/2018 | Bae et al. | |
| 2018/0084680 A1 | 3/2018 | Jarvis et al. | |
| 2018/0190408 A1 | 7/2018 | Chin | |
| 2019/0041909 A1 | 2/2019 | Pakula et al. | |
| 2019/0082083 A1 | 3/2019 | Jarvis et al. | |

OTHER PUBLICATIONS

"Magnetic shielding materials to protect sensitive electronics", Electronic Products, https://www.electronicproducts.com/Packaging_and_Hardware/Shielding_and_insulation/Magnetic_shielding_materials_to_protect_sensitive_electronics.aspx, posted on Sep. 22, 2014, 3 pages.

* cited by examiner

PORTABLE ELECTRONIC DEVICE

FIELD

The following description relates to an electronic device. In particular, the following description relates to a portable electronic device (e.g., smartphone) having various features and enhancements.

BACKGROUND

Portable electronic devices are known to include a housing and a cover glass that combines with the housing to enclose components such as a circuit board, a display, and a battery. Also, portable electronic devices are known to communicate over a network server to send and receive information, as well as communicate with a network carrier to send and receive voice communication.

SUMMARY

An electronic device includes a battery configured for receiving power from inductive charging and an inductive coil in communication with the battery. The inductive coil is formed of a length of a wire having a conductive core capable of carrying an electrical current. The conductive core is surrounded by an insulating layer that electrically isolates the conductive core and portions of the length of wire include a magnetically permeable material that is plated in a pattern on an exposed surface of the conductive core.

A portable electronic device includes a battery and an inductive charging unit coupled to the battery. The inductive charging unit is capable of providing power to the battery and includes an inductive coil that is formed of a wire arranged in a spiral pattern having one end electrically coupled to a ground and a second end electrically coupled to the battery. The wire includes a conductive core capable of carrying an electrical current that is induced by an interaction with an external magnetic field. The conductive core is at least partially surrounded by an insulating layer that electrically isolates the conductive core and portions of the length of wire include a magnetically permeable material that is plated on an exposed surface of the conductive core in a pattern. The magnetically permeable material is capable of limiting an eddy current induced by a magnetic field from an adjacent portion of the wire.

A method of forming an inductive charging unit is described. The inductive charging unit has a single length of a wire having a conductive core capable of carrying an electrical current, wherein the conductive core is surrounded by an insulating layer that electrically isolates the conductive core. The method is carried out by exposing at least a portion of an exterior surface of the conductive core and plating a magnetically permeably material on the exposed exterior surface of the conductive core in a pattern.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
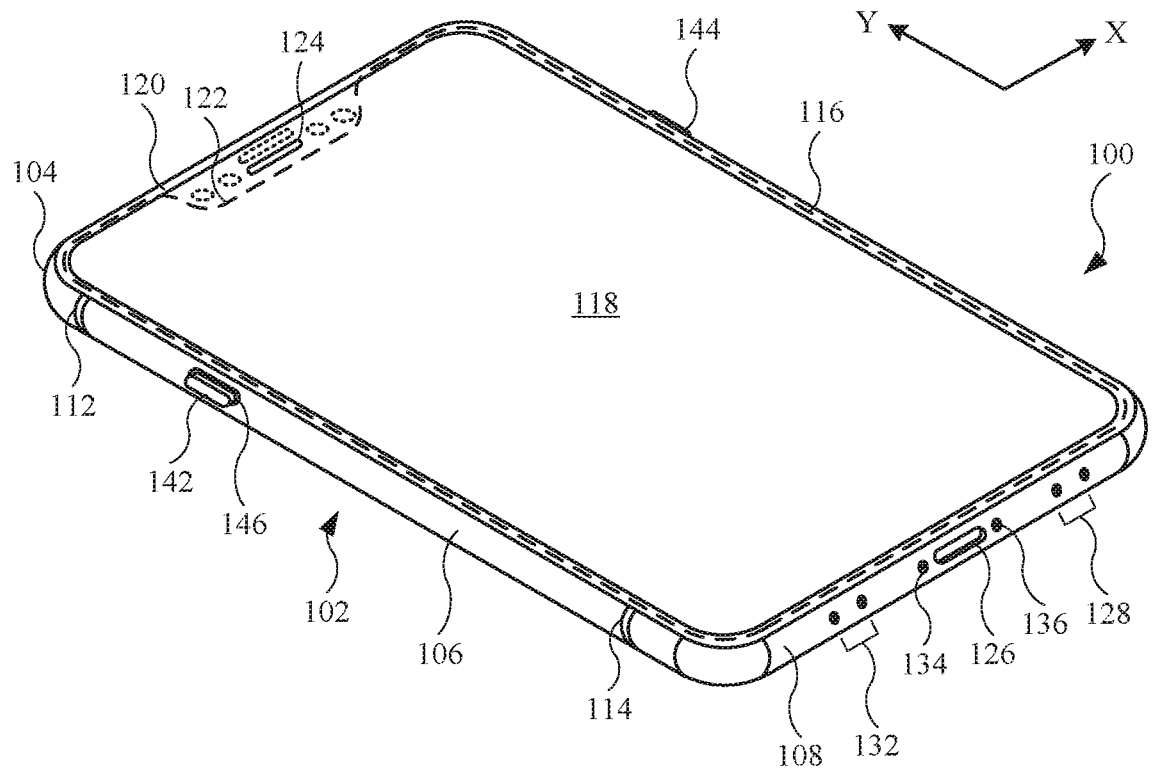
FIG. 1 illustrates a front isometric view of an embodiment of an electronic device, in accordance with some described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

A changing magnetic field, by electromagnetic induction, can influence the distribution of an electric current flowing within an electrical conductor. For example, when current flows through a conductor, it creates an associated magnetic field around it. The magnetic field induces eddy currents in adjacent conductors, altering the overall distribution of current flowing through them. When, for example, two conductors are nearby each other and carrying current in the same direction, the current in each conductor is concentrated in the areas of the conductor farthest away from the nearby conductor. Referred to as the proximity effect, the redistribution of current flowing within the two conductors can significantly increase the resistance of both conductors.

For example, if two portions of a single wire (i.e., carrying the same current) are arranged parallel to one another, as would be found in a coil such that the current in adjacent portions of the coil flows in the same direction, the magnetic field of a first portion of the wire will induce longitudinal eddy currents in a second, adjacent, portion of the wire. In this situation, the eddy currents flow in long loops along the second portion of the wire, in the same direction as the main current on the side of the second portion of the wire facing away from the first portion of the wire, and back in the opposite direction on the side of the second portion of the wire facing the first portion of the wire. In this way, the eddy current reinforces the current on the side of the second portion of the wire facing away from the first portion of the wire and opposes the current on the side facing the first portion of the wire. The net effect is to redistribute the current in the cross section of the second portion of the wire into a thin strip on the side facing away from the first portion of the wire resulting in an increased resistance (the same effect occurs in the first portion of the wire due to the second portion of wire).

One way to mitigate the proximity effect is to increase the spacing (or pitch) between adjacent wires (or portions of wires in a loop). However, increasing the spacing between the adjacent portions would reduce the magnetic field provided by the loop resulting in reduced power that can be inductively transferred. Moreover, in the case of a small form factor portable electronic device, the amount of space available to increase the distance between adjacent portions of the wire is quite limited. Accordingly, the following describes a mechanism for mitigating the proximity effect while maintaining a nominal distance between adjacent portions of a wire loop in an inductive coil. The nominal distance can be a value that is consistent with providing an electromagnetic field capable of transferring a desired amount of power between an inductive transmitter and a corresponding inductive receiver. In one embodiment, the inductive receiver (or transmitter) includes a coil having at least a single wire having a first end connected to a power storage unit (such as a battery) and a second end connected to a ground and arranged in a loop. By loop it is meant that the wire, in one embodiment, takes on a spiral like shape (however any suitable shape is possible) such that adjacent portions of the wire carry current in the same direction. In order to mitigate the proximity effect between adjacent portions of the wire, surfaces of the wire include a material capable of mitigating (reducing) the eddy currents formed due to the magnetic field provided by the adjacent portion of the wire. In this way, the reduction of the eddy currents results in a reduction of the current at the surfaces of the wires affected by the eddy currents. More particularly, a cross section of the current flowing within adjacent portions of wire shows a more even distribution than would otherwise be possible. In this way, the overall current distribution is "flattened" out resulting in an overall reduction in resistance to the flow of current in both portions of the wire increasing the overall efficiency (Q factor) of any inductive transfer carried out by the coil. In one embodiment, the surface of the wire can be plated with a ferromagnetic material such as iron (Fe), nickel (Ni), or alloys of iron and nickel, and so forth.

The following disclosure relates to an electronic device, such as a mobile communication device that takes the form of a smart phone or a tablet computer device. The electronic device can include several enhancements and modifications not found on traditional electronic devices. For example, the electronic device may include a protective cover (transparent material) and a display assembly coupled to the protective cover, with the display assembly extending to the edges (or at least substantially to the edges) of the protective cover, thereby providing an "edge to edge" appearance of the display assembly as visual information (textual, still images, or motion images, i.e., video) are seen at or near the edges of the protective cover.

The electronic device may further include wireless power receiving module designed to receive power by magnetic induction and use the power to provide energy directly to charge the battery assembly. The wireless power receiving module may include a receiver coil such that, when exposed to magnetic flux from an alternating electromagnetic field, received an induced (alternating) current that can be converted to a direct current. The wireless power receiving module may provide a simplified by method for charging the battery, whereby exposure to the magnetic flux, rather than plugging a connector (of a cable assembly) into the electronic device, is sufficient to charge the battery assembly.

These and other embodiments are discussed below with reference to FIGS. 1-6. However, those skilled in the art will readily appreciate that the detailed description given herein with respect to these Figures is for explanatory purposes only and should not be construed as limiting.

FIG. 1 illustrates a front isometric view of an embodiment of an electronic device 100, in accordance with some described embodiments. In some embodiments, the electronic device 100 is a tablet computer device. In the embodiment shown in FIG. 1, the electronic device 100 is a mobile wireless communication device (a smartphone, for example). The electronic device 100 may include a band 102 that extends defines an outer perimeter of the electronic device 100. The band 102 may include a metal, such as aluminum, stainless steel, or an alloy that includes at least one of aluminum or stainless steel. The band 102 may be composed of several sidewall components, such as a first sidewall component 104, a second sidewall component 106, a third sidewall component 108 (opposite the first sidewall component 104), and a fourth sidewall component (not shown in FIG. 1). The aforementioned sidewall components may include any material(s) previously described for the band 102.

In some instances, some of the sidewall components form part of an antenna assembly (not shown in FIG. 1). As a result, a non-metal material, or materials, may separate the sidewall components of the band 102 from each other in order to electrically isolate the sidewall components. For example, a first composite material 106 separates the first sidewall component 104 from the second sidewall component 106, and a second composite material 108 separates the second sidewall component 106 from the third sidewall component 108. The aforementioned composite may include an electrically inert, or insulating, material(s), such as plastics and/or resin, as non-limiting examples.

The electronic device 100 may further include a display assembly 116 (shown as a dotted line) that is covered by a protective cover 118. The display assembly 116 may include multiple layers (discussed below), with each layer providing a unique function. The display assembly 116 may be partially covered by a border 120, or frame, that extends along an outer edge of the protective cover 118 and partially covers an outer edge of the display assembly 116. The border 120 can be positioned to hide or obscure any electrical and mechanical connections between the layers of the display assembly 116 and flexible circuit connectors. This will be shown below. Also, the border 120 may include uniform thickness. For example, the border 120 may include a thickness that generally does not change in the X- and Y-dimensions.

Also, as shown in FIG. 1, the display assembly 116 may include a notch 122, representing an absence of the display assembly 116. The notch 122 may allow for a vision system (discussed below) that provides the electronic device 100 with information for object recognition, such as facial recognition. In this regard, the electronic device 100 may include a masking layer with openings (shown as dotted lines) designed to hide or obscure the vision system, while the openings allow the vision system provide the object recognition information. This will be further discussed below. Also, the protective cover 118 may be formed from a transparent material, such as glass, plastic, sapphire, or the like. In this regard, the protective cover 118 may be referred to as a transparent cover, a transparent protective cover, or a cover glass (when the protective cover 118 includes glass). As shown in FIG. 1, the protective cover 118 includes an opening 124, which may represent a single opening of the protective cover 118. The opening 124 may allow for transmission of acoustical energy (in the form of audible sound) into the electronic device 100, which may be received by a microphone (not shown in FIG. 1) of the electronic device 100. Further, the opening 124 may allow for transmission of acoustical energy (in the form of audible sound) out the electronic device 100, which may be generated by an audio module (not shown in FIG. 1) of the electronic device 100. Also, the electronic device 100 may not include a button, such as "home button," commonly found in electronic devices, as the protective cover 118 does not include additional openings.

The electronic device 100 may further include a port 126 designed to receive a connector of a cable assembly. The port 126 allows the electronic device 100 to communication data information (send and receive), and also allows the electronic device 100 to receive electrical energy to charge a battery assembly (not shown in FIG. 1). Accordingly, the port 126 may include terminals (not shown in FIG. 1) that electrically couple to the connector.

Also, the electronic device 100 may include several openings. For example, the electronic device 100 may include openings 128 that allow an additional audio module (not shown in FIG. 1) of the electronic device to emit acoustical energy out of the electronic device 100. The electronic device 100 may further include openings 132 that allow an additional microphone (not shown in FIG. 1) of the electronic device to receive acoustical energy. Also, the electronic device 100 may include a first fastener 134 and a second fastener 136 designed to secure with a rail (not shown in FIG. 1) that is coupled to the protective cover 118. In this regard, the first fastener 134 and the second fastener 136 are designed to couple the protective cover 118 with the band 102.

The electronic device 100 may include several control inputs designed to provide a command to the electronic device 100. For example, the electronic device 100 may include a first control input 142 and a second control input 144. The aforementioned control inputs may be used to adjust the visual information presented on the display assembly 116 or the volume of acoustical energy output by an audio module, as non-limiting examples. The controls may include one of a switch or a button designed to generate a command to a processor circuit (not shown in FIG. 1). The control inputs may at least partially extend through openings in the sidewall components. For example, the second sidewall component 106 may include an opening 146 that receives the first control input 142.

Figure 2:
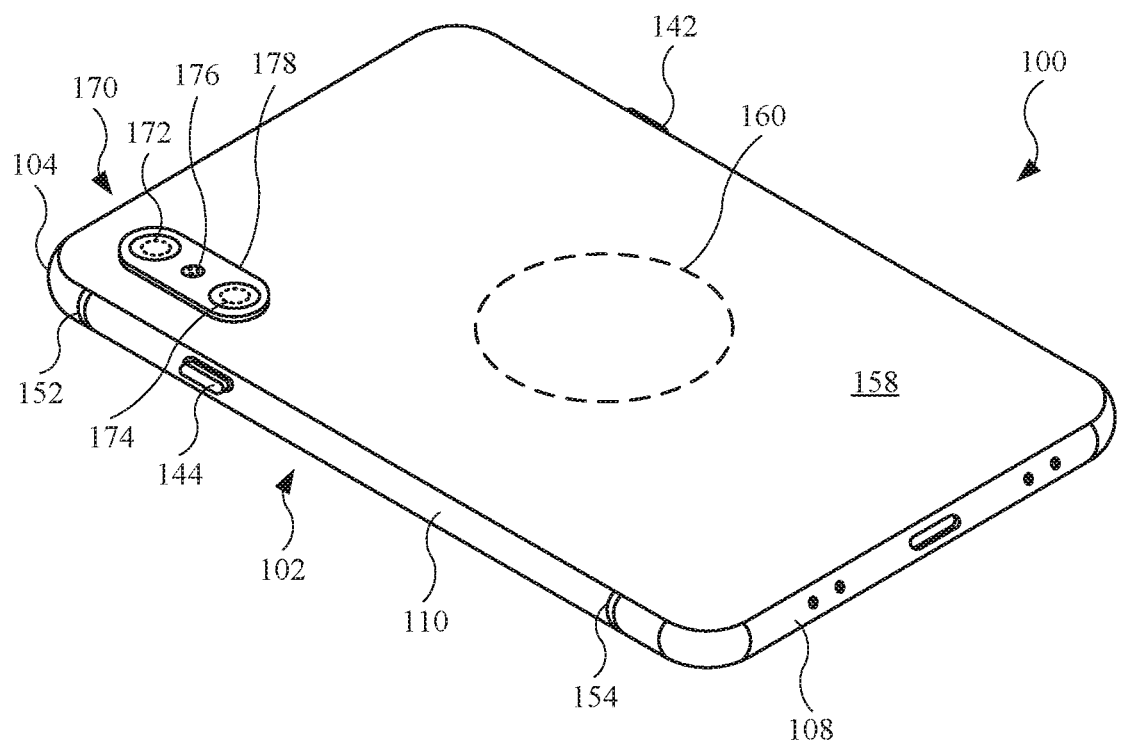
FIG. 2 illustrates a rear isometric view of the electronic device shown in FIG. 1.

FIG. 2 illustrates a rear isometric view of the electronic device 100 shown in FIG. 1. In addition to the aforementioned sidewall components, the band 102 may further include a fourth sidewall component 110. As shown, a third composite material 152 separates the first sidewall component 104 from the fourth sidewall component 110, and a fourth composite material 154 separates the fourth sidewall component 110 from the third sidewall component 108.

The electronic device 100 may further include a protective cover 158 that couples with the band 102. In this regard, the protective cover 158 may combine with the band 102 to form an enclosure of the electronic device 100, with the enclosure (band 102 and protective cover 158) defining an internal volume that carries several internal components, such as a battery assembly, circuit board assembly, vision system, as non-limiting examples. The protective cover 158 may include any material(s) previously described for the protective cover 108 (shown in FIG. 1). When the protective cover 158 include a non-metal material, the electronic device 100 may provide hardware (and software) to support wireless charging. For example, the electronic device 100 may include a wireless power receiving module 30 (represented by a dotted line) covered by the protective cover 158. The wireless power receiving module 30 is designed to receive an induced current when exposed to an alternating electromagnetic field. This will be further discussed below. Also, the protective cover 118 (shown in FIG. 1) may be referred to as a "front protective cover" and the protective cover 158 may be referred to as a "rear protective cover," as the front of the electronic device 100 is generally associated with the display assembly 116 (which is covered by the protective cover 118), and the back of the electronic device 100 is generally associated with a rear wall, such as the protective cover 158.

The electronic device 100 may further include a camera assembly 170, which may include a dual camera assembly. As shown, the camera assembly 170 may include a first camera module 172, a second camera module 174, and a light emitter 176 positioned between the first camera module 172 and the second camera module 174. The light emitter 176 is designed to provide additional lighting during an image capture event by the first camera module 172 and/or the second camera module 174. However, it is desired to isolate some of the light "leakage" from the light emitter into the first camera module 172 and the second camera module 174. In this regard, the camera assembly 170 may further include a trim element (not shown in FIG. 1) designed to optically isolate the light emitter 176 from the first camera module 172 and the second camera module 174. In this manner, the first camera module 172 and the second camera module 174 may only receive desired light from the light emitter 176, such as light reflected from an object, the image of which is the first camera module 172 and/or the second camera module 174). The trim element will be further shown and described below. Also, the camera assembly 170 may further include a protective cover 178 formed from a transparent material that covers the first camera module 172, the second camera module 174, and the light emitter 176. However, the protective cover 178 may include a masking layer (not shown in FIG. 2) designed to at least partially obscure part of protective cover the first camera module 172, the second camera module 174, and the light emitter 176. It should be noted, however, that the masking layer includes openings that allow the first camera module 172 and the second camera module 174 to capture images, and that allow the light emitter 176 to emit light that exits the electronic device 100. Also, as shown in FIG. 2, the first camera module 172 and the second camera module 174 are aligned (collectively) in a manner that is parallel with respect to the second sidewall component 106 (shown in FIG. 1) and the fourth sidewall component 110. In other words, an imaginary line can be drawn through the first camera module 172 and the second camera module 174 that is parallel with respect the second sidewall component 106 (shown in FIG. 1) and the fourth sidewall component 110. Moreover, the electronic device 100 may further include a wireless power receiving module 160 designed to provide electrical energy to a battery assembly. The wireless power receiving module 160 may include a receiver coil (not shown) designed to receive an induced current by an alternating electromagnetic field generated by a transmitter coil (not shown) that is external with respect to the electronic device 100.

Figure 3:
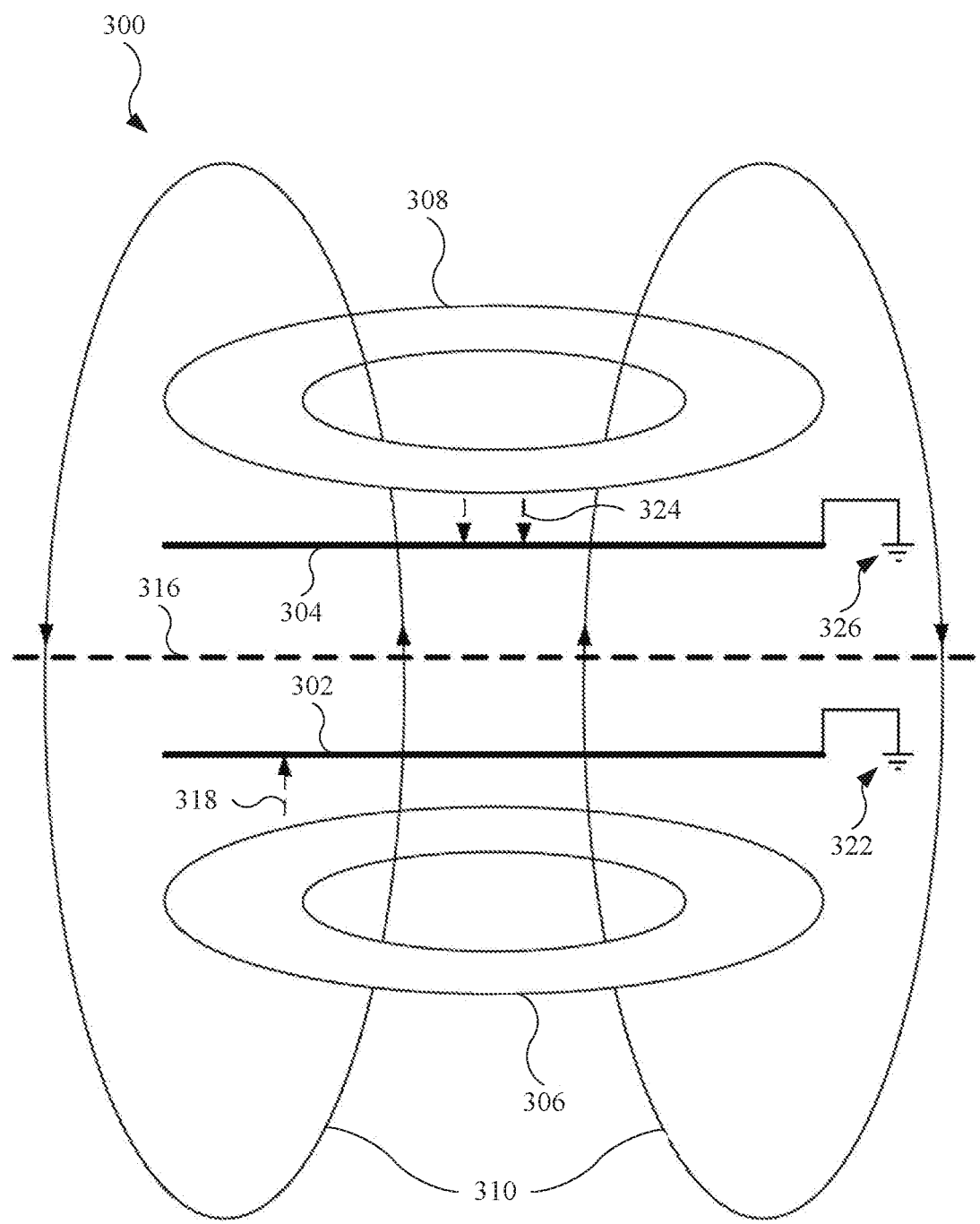
FIGS. 3-4 illustrate examples of inductive charging and components used for inductive charging.

FIG. 3 is a simplified diagram illustrating an exemplary wireless charging system 300 including a transmitter shield 302 and a receiver shield 304, in accordance with some described embodiments. The transmitter shield 302 may be positioned in front of a transmitter coil 306 so that magnetic flux 310 is directed toward the transmitter shield 302. For instance, the transmitter shield 302 is positioned between a transmitter coil 306 and a receiver coil 308 during wireless power transfer so that the magnetic flux 310 first passes through the transmitter shield 302 before reaching the receiver coil 308. In some embodiments, the transmitter shield 302 can be positioned between an interface 316 and transmitter coil 306 when an electronic device (such as the electronic device 100, shown in FIGS. 1 and 2) rests on a wireless charging device to perform wireless power transfer to the electronic device. Accordingly, the transmitter shield 302 and the transmitter coil 306 can both be positioned within the wireless charging device. The transmitter shield 302 can be substantially transparent to the magnetic flux 310 so that the receiver coil 308 receives a substantial percentage of the magnetic flux 310 generated by the transmitter coil 306.

While the transmitter shield 302 can be substantially transparent to the magnetic flux 310, the transmitter shield 302 can, on the other hand, be substantially opaque to an electric field 318 such that the transmitter shield 302 substantially blocks the electric field. This prevents electric field 318 from exposing on the receiver coil 308 and generating a detrimental voltage on the receiver coil 308. Due in part to the transmitter shield 302 substantially blocking the electric field 318 before the electric field 318 can reach the receiver coil 308, the electric field 318 may generate voltage on the transmitter shield 302 instead of the receiver coil 308. The amount of voltage generated on the transmitter shield 302 may correspond to the amount of voltage that would have been generated on the transmitter coil 308 had the transmitter shield 302 not been present.

In some embodiments, voltage generated on the transmitter shield 302 can be removed so that the voltage does not permanently remain on the transmitter shield 302. As an example, voltage on the transmitter shield 302 can be discharged to ground. Thus, transmitter shield 302 can be coupled to a ground connection 322 to allow voltage on the transmitter shield 302 to be discharged to ground. The ground connection 322 can be a ground ring or any other suitable conductive structure coupled to ground that can remove voltage from the transmitter shield 302.

Similar to the transmitter shield 302, the receiver shield 304 may also be implemented in the wireless charging system 300 to prevent detrimental voltage from being generated on the transmitter coil 306 from an electric field 324 generated by the receiver coil 308. The receiver shield 304 may be positioned in front of the receiver coil 308 so that the magnetic flux 310 first passes through the receiver shield 304 before reaching the receiver coil 308. In some embodiments, the receiver shield 304 and the receiver coil 308 are positioned within a wireless power receiving module, which in turn is positioned within a housing of an electronic device (such as the electronic device 100, shown in FIGS. 1 and 2). Within the module, the receiver shield 304 can be positioned between the interface 316 and the receiver coil 308 when the electronic device rests on a wireless charging device to perform wireless power transfer.

Similar to the transmitter shield 302, the receiver shield 304 can be substantially transparent to the magnetic flux 310 so that a substantial percentage of the magnetic flux 310 generated by the transmitter coil 306 passes through the receiver shield 304 and is received by the receiver coil 308, while the receiver shield 304 can be substantially opaque to the electric field 324 such that the receiver shield 304 substantially blocks the electric field 324. This prevents the electric field 324 from reaching the transmitter coil 306 and generating a detrimental voltage on the transmitter coil 306 while enabling wireless power transfer. Like the transmitter shield 302, the receiver shield 304 may also be grounded so that voltage generated by the electric field 324 may be discharged to a ground connection 326. The ground connection 326 may be a structure similar to the ground connection 322 in some embodiments, or it may be the same structure as the ground connection 322 in other embodiments.

By incorporating the transmitter shield 302 and the receiver shield 304 into the wireless charging system 300, the wireless charging device and the electronic device within which the transmitter shield 302 and the receiver shield 304 are implemented, respectively, are exposing their grounds to each other. This mutes any ground noise caused by the electrical interactions between the transmitter coil 306 and the receiver coil 308. As can be appreciated by disclosures herein, the transmitter shield 302 and the receiver shield 304 are shielding structures that are able to block the passage of electric fields, yet allow the passage of magnetic flux. Also, in some embodiments, a transmitter shield can be included in a wireless charging device, such as a wireless charging mat, and a receiver shield can be included within a wireless power receiving module included within a portable electronic device configured to rest on the wireless charging device to wirelessly receiver power from the wireless charging mat.

Figure 4:
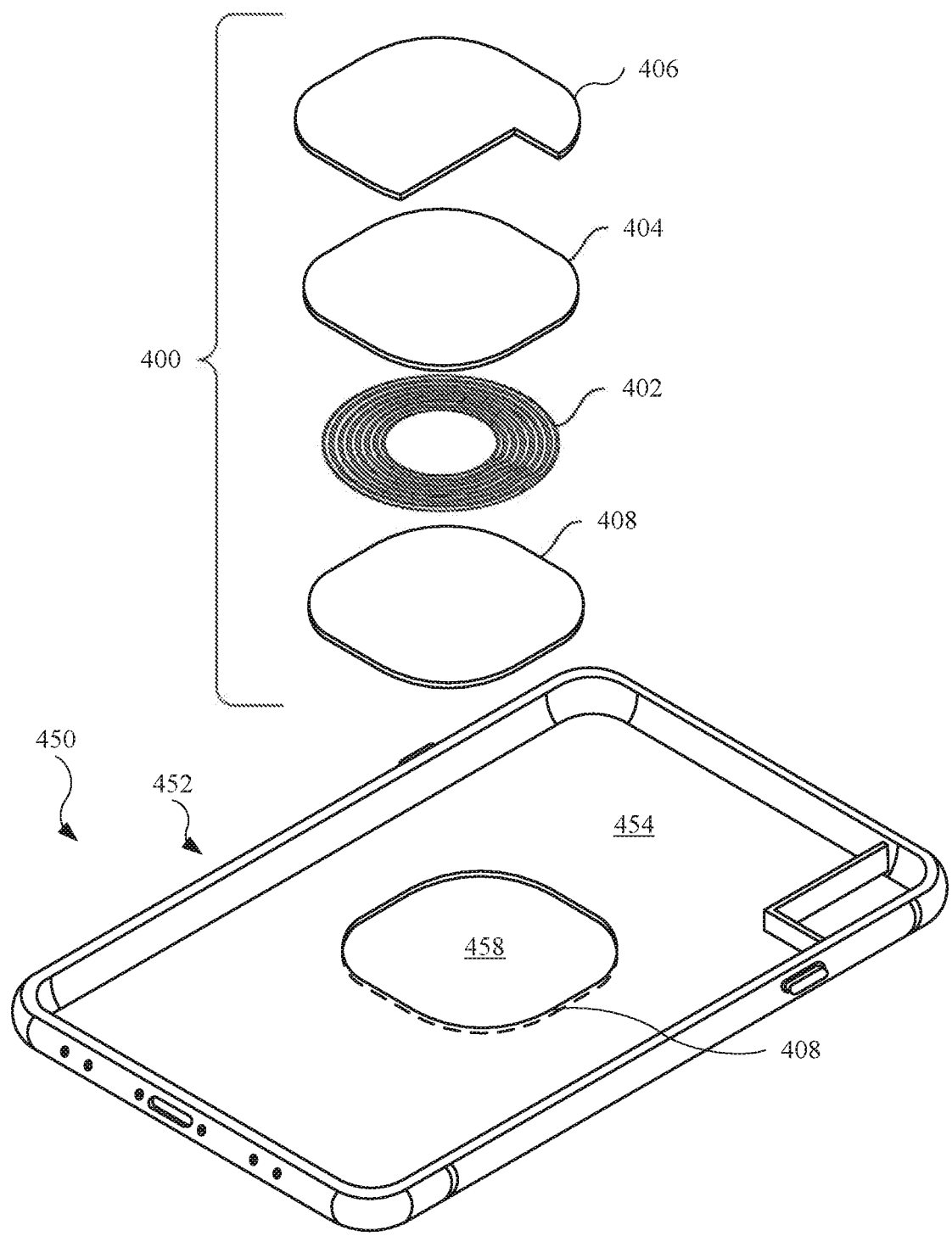

FIG. 4 illustrates an exploded view of a wireless power receiving module 400 that can be incorporated into an electronic device 450 to receive power by magnetic induction, in accordance with some described embodiments. The wireless power receiving module 400 may be incorporated with the electronic device 450 in order to receive, and subsequently provide, electrical energy to a battery assembly. Also, the wireless power receiving module 400 may be positioned in the opening 452 of the chassis 454. Accordingly, the opening 452 may include a size and shape to receive the wireless power receiving module 400. Also, the wireless power receiving module 400 can include several separate shields. For example, the wireless power receiving module 400 may include an integrated coil 402, a ferrite shield 404, and a thermal shield 406 along with an adhesive component 408 that attaches the wireless power receiving module 400 to the protective cover 458. Although not shown, an additional non-metal structural element may be positioned between the protective cover 458 and the wireless power receiving module 400.

The integrated coil 402 can act as, for example, a receiver coil and a receiver shield. In this manner, integrated coil 402 may enable the wireless power receiving module 400 to wirelessly receive power transmitted from a wireless power transmitting coil. When positioned within the electronic device 450, integrated coil 402 may be positioned near the charging surface of the electronic device (which may be defined in part by the protective cover 458). Thus, the receiver shield is positioned between the receiver coil and the transmitter coil and serves to prevent capacitive coupling to the transmitter coil in a wireless charging device use to induce a current to the wireless power receiving module 400. The ferrite shield 404 acts as a magnetic field, or B-field, shield redirecting magnetic flux to get higher coupling to the transmitter coil resulting in improved charging efficiency and helping prevent magnetic flux interference. The thermal shield 406 can include a graphite or similar layer that provides thermal isolation between wireless power receiving module 400 and the battery and other components of the electronic device in which the wireless power receiving module 400 is incorporated. The thermal shield 406 can also include a copper layer that is tied to an electrical ground and contributes to the thermal shielding while also capturing stray flux In inductive charging systems, the electronic device is in inductive communication with a charging pad and is receiving signal from the charging pad. However, due to the amount of interference that can be generated during the inductive charging, the features of the phone display (e.g., touch display, applications, web browsing, etc.) are not available as their functions are disrupted by the inductive charging signal. Therefore, shielding to prevent the inductive signals from interfering with the display functionality while also maintaining inductive charging capabilities are desired.

A changing magnetic field, by electromagnetic induction, can influence the distribution of an electric current flowing within an electrical conductor. For example, when current flows through a conductor, it creates an associated magnetic field around it. The magnetic field induces eddy currents in adjacent conductors, altering the overall distribution of current flowing through them. When, for example, two conductors are nearby each other and carrying current in the same direction, the current in each conductor is concentrated in the areas of the conductor farthest away from the nearby conductor. Referred to as the proximity effect, the redistribution of current flowing within the two conductors can significantly increase the resistance of both conductors.

For example, if two portions of a single wire (i.e., carrying the same current) are arranged parallel to one another, as would be found in a coil such that the current in adjacent portions of the coil flows in the same direction, the magnetic field of a first portion of the wire will induce longitudinal eddy currents in a second, adjacent, portion of the wire. In this situation, the eddy currents flow in long loops along the second portion of the wire, in the same direction as the main current on the side of the second portion of the wire facing away from the first portion of the wire, and back in the opposite direction on the side of the second portion of the wire facing the first portion of the wire. In this way, the eddy current reinforces the current on the side of the second portion of the wire facing away from the first portion of the wire and opposes the current on the side facing the first portion of the wire. The net effect is to redistribute the current in the cross section of the second portion of the wire into a thin strip on the side facing away from the first portion of the wire resulting in an increased resistance (the same effect occurs in the first portion of the wire due to the second portion of wire).

In order to mitigate the proximity effect between adjacent portions of the wire, surfaces of the wire include a material capable of mitigating (reducing) the eddy currents formed due to the magnetic field provided by the adjacent portion of the wire. In this way, the reduction of the eddy currents results in a reduction of the current at the surfaces of the wires affected by the eddy currents. In one embodiment, the material can be plated on an exposed surface of a core conductor in a pattern.

In one embodiment, the pattern can be a disjoint pattern by which it is meant that portions of the plated magnetically permeable material can be electrically isolated from each other. In another embodiment, the pattern can take on a spiral shape that wraps around an exposed surface of the conductive core. In one embodiment, the spiral shaped pattern can be disjoint in that the spiral shaped pattern includes electrically disjoint regions. In this way, induced magnetic loops are limited to individual regions thereby limiting the effects on the current density in conductive core.

Figure 5A:
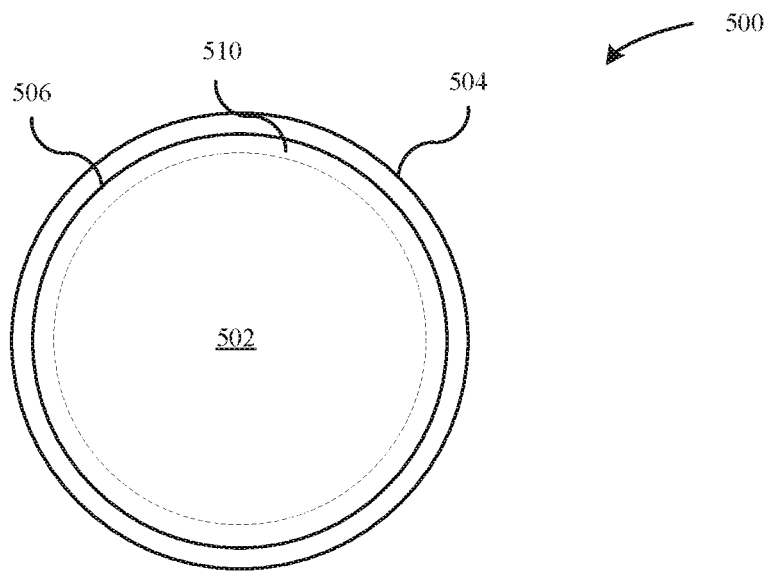
FIGS. 5A-5B illustrates portions of inductive coil in accordance with the described embodiments.
Figure 5B:
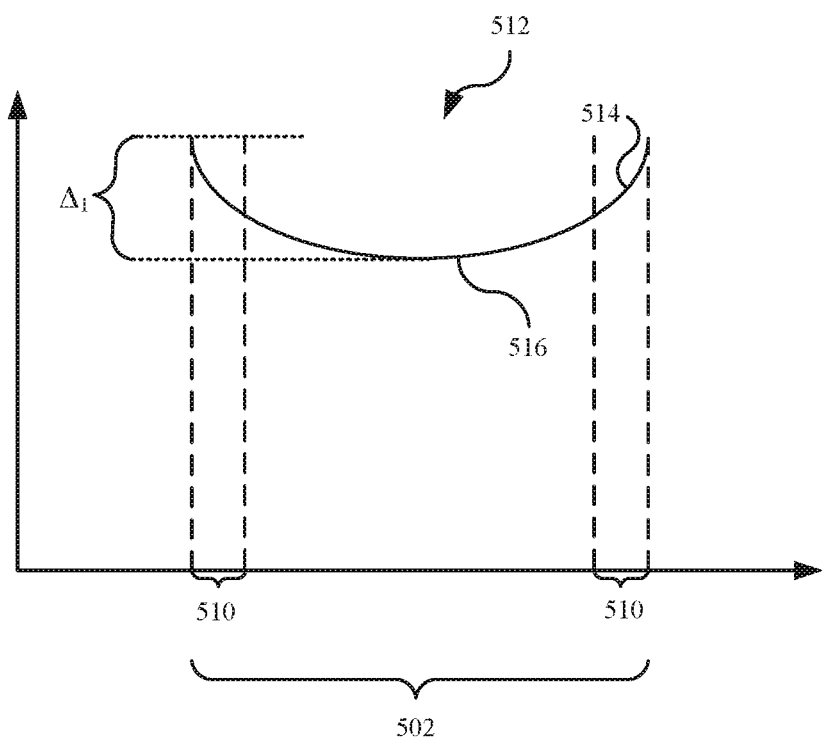
Figure 6A:
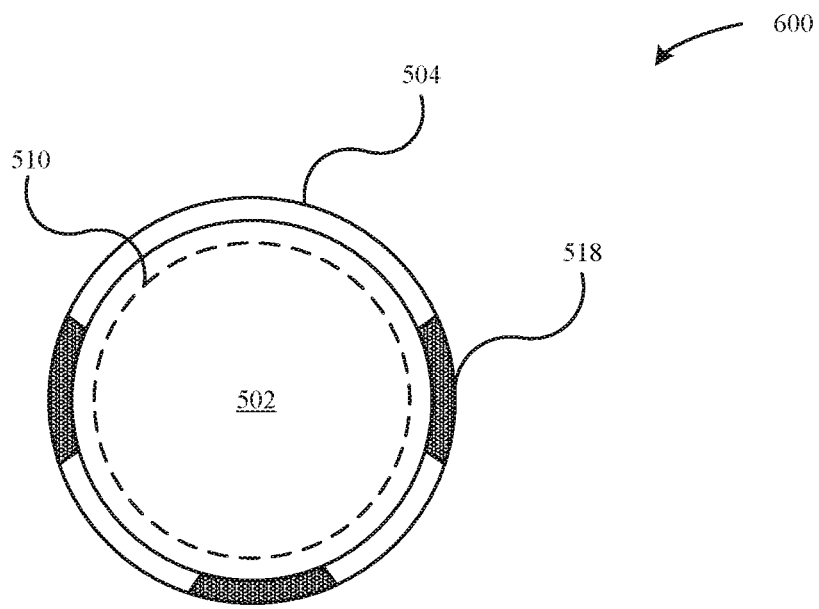
FIGS. 6A-6B illustrates portions of inductive coil in accordance with the described embodiments.
Figure 6B:
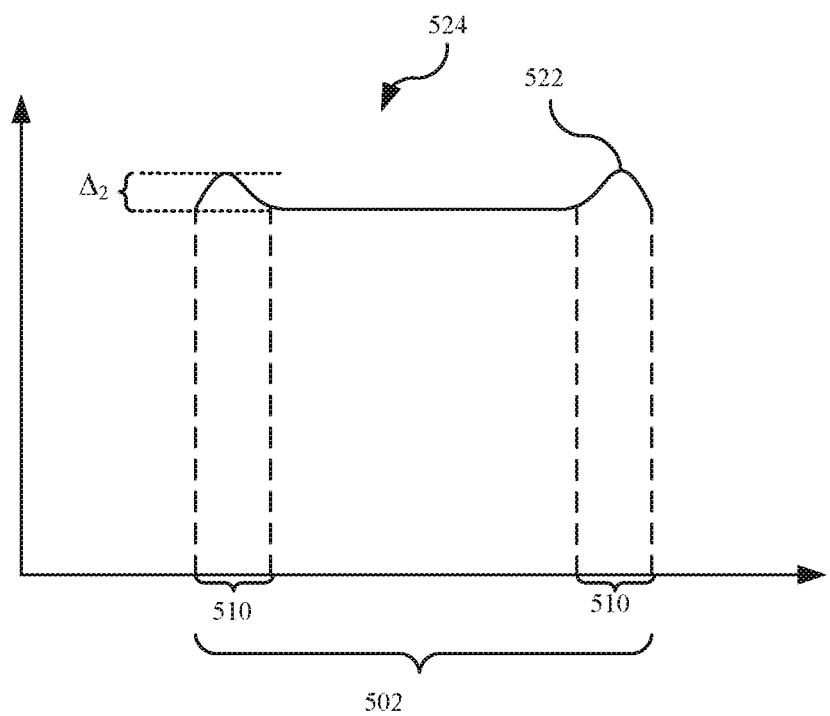

For example, FIG. 5A shows representative cross section 500 of conductive core 502 surrounded by insulating layer 504 at surface 506 and that lacks plated magnetically permeable material. FIG. 5B shows corresponding current density profile 512 that exhibits current spikes 514 within annular region 510 of conductive core 502. Current density profile distribution 512 can be characterized as having current density difference $\Delta 1$ between current spike 514 and minimum current 516 corresponding to an increase in overall resistance to a current flow in conductor core 502. However, FIG. 6A illustrates an embodiment whereby layer 518 of magnetically permeable material is plated on an exposed portion of surface 506 The presence of magnetically permeable material 518 can mitigate the formation of eddy currents caused by the presence of a magnetic field induced by a current flow in an adjacent conductive core (not shown). Accordingly, as shown in FIG. 6B, layer 518 can reduce eddy currents created in annular region 510 thereby reducing current spikes 522 in corresponding current density distribution within annular region 510 resulting in "smoother" current density profile 524 having a corresponding current density difference $\Delta 2$ less than current density difference $\Delta 1$. In this way, the overall resistance to a current flow in conductive core 502 is commensurably reduced.

It should be noted that in one embodiment, layer 516 can be plated in a disjoint pattern by which it is meant that plated layer 516 can be formed of individual segments (see FIG. 5B) each of which are electrically isolated from each other (i.e., disjoint). In this way, the inducing magnetic flux loop can be reduced to smaller magnetic loops reducing the overall effect on the current distribution in annular region 510. In another embodiment, plated layer 516 can take on a more continuous pattern, such as a spiral. In any case, the effect of plated layer 516 is to reduce the current density in annular region 510. It should be noted that a thickness of plated layer 516 can generally in the range of about 1-1.5 microns. In any case, the thickness is less than that of the insulating layers such that the distance between adjacent conductive cores is not increased. In this way, the overall current distribution is "flattened" out resulting in an overall reduction in resistance to the flow of current in both portions of the wire increasing the overall efficiency (Q factor) of any inductive transfer carried out by the coil. In one embodiment, the surface of the wire can be plated with a ferromagnetic material such as iron (Fe), nickel (Ni), or alloys of iron and nickel, and so forth.

Figure 7A:
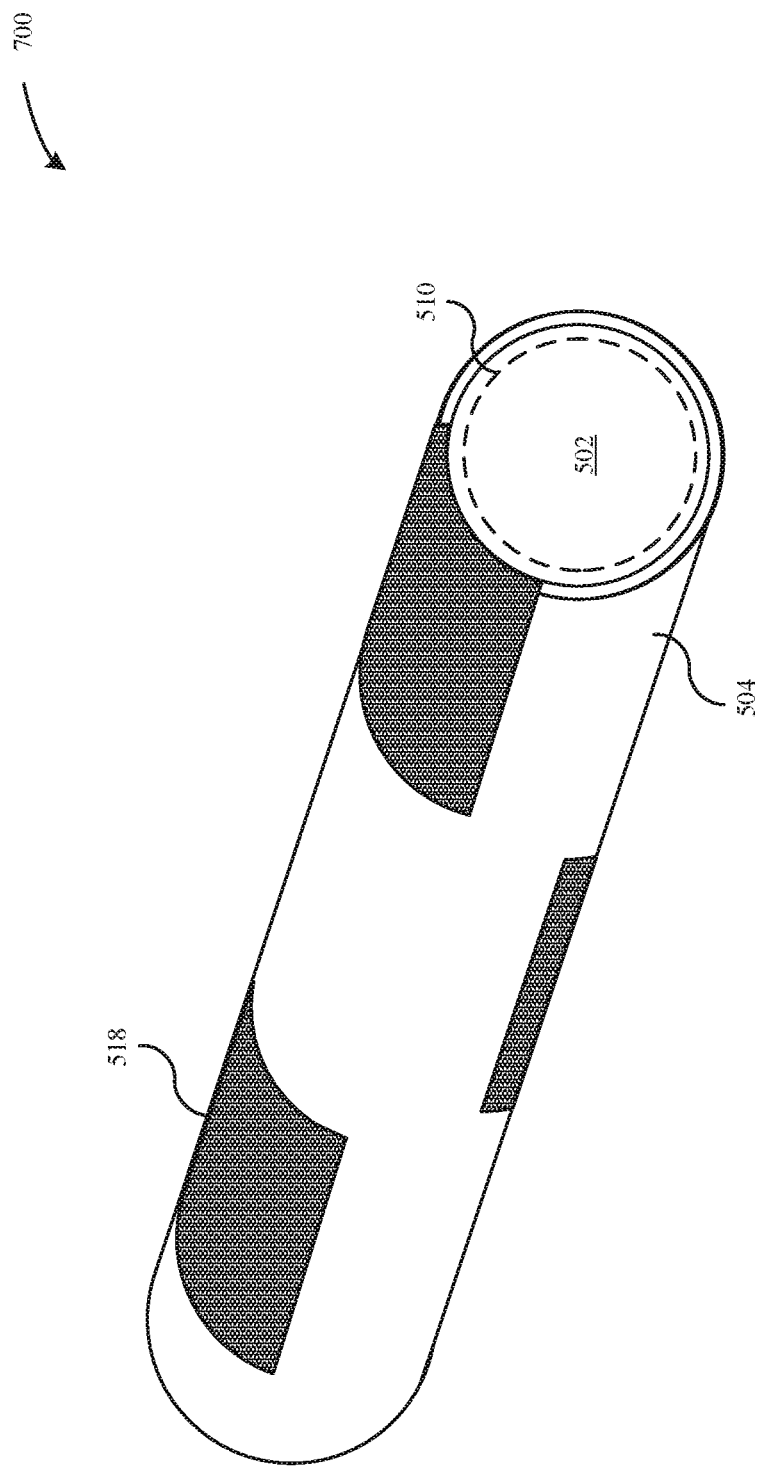
FIGS. 7A-7C illustrates portions of inductive coil in accordance with the described embodiments.
Figure 7B:
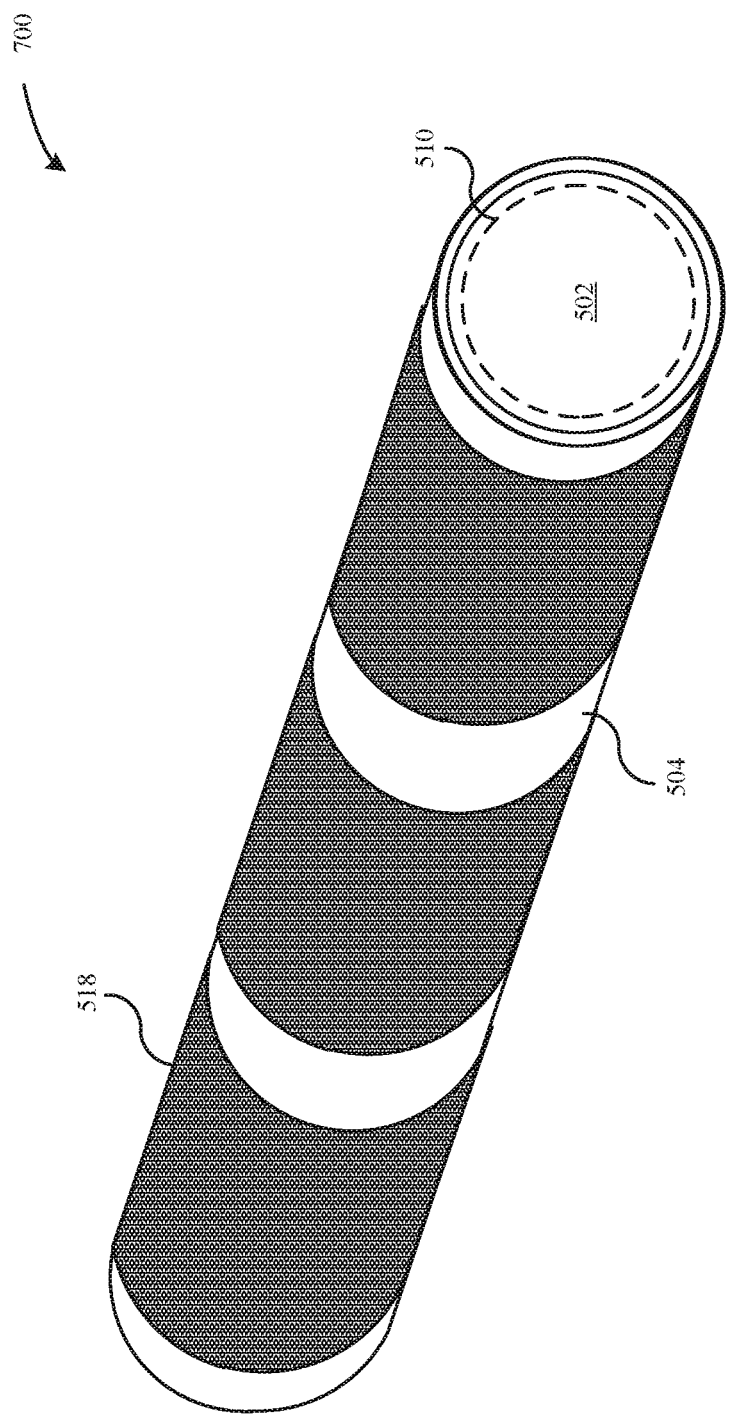
Figure 7C:
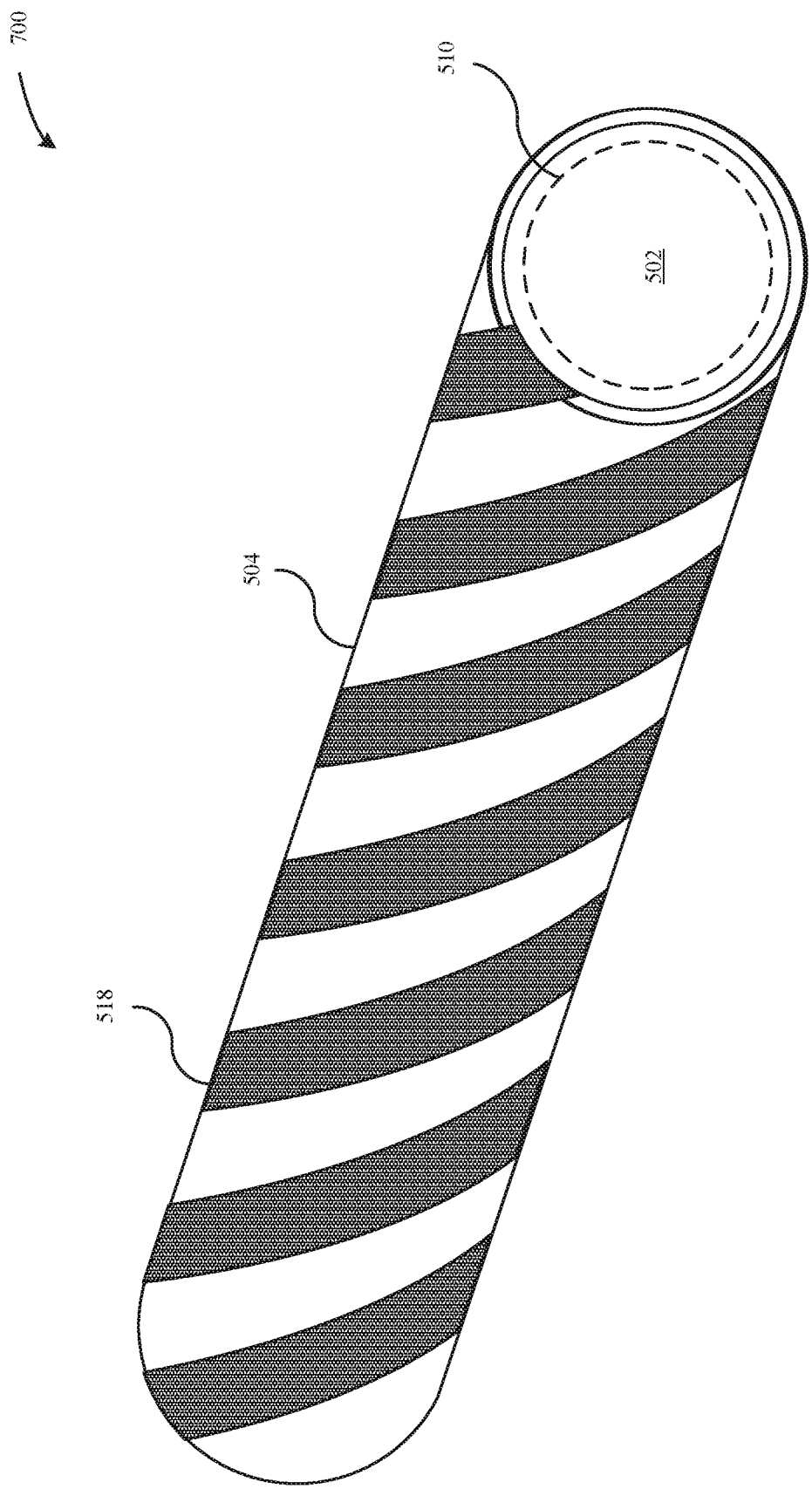

More specifically, FIG. 7A shows configuration 700 showing regions of layer 518 of plated magnetically permeable arranged in a disjoint pattern. In this arrangement, the regions are separate from each other by insulating layer 504 and are therefore electrically isolated from each other. FIG. 7B shows another disjoint pattern whereby the regions of layer 518 are separated from each other by insulating layer 504 in a striped pattern. FIG. 7C shows a non-disjoint pattern whereby a single layer 518 of magnetically permeable material forms a spiral pattern.

Figure 8:
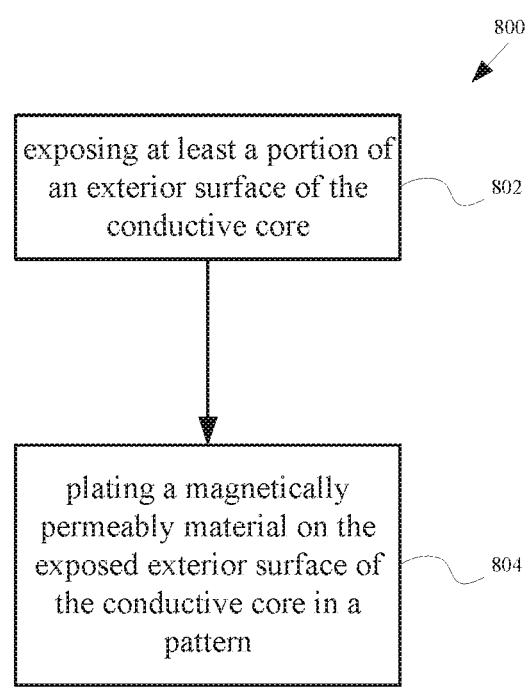
FIG. 8 shows a flowchart in accordance with the embodiments.

FIG. 8 shows a flowchart detailing process 800 in accordance with the described embodiments. More particularly, process 800 can be carried out by, at 802, exposing at least a portion of an exterior surface of the conductive core, and, at 804, plating a magnetically permeably material on the exposed exterior surface of the conductive core in a pattern.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
   a battery; and
   an inductive coil capable of providing power to the battery, the inductive coil comprising:
      a wire having a conductive core capable of carrying an electrical current;
      an insulating layer that surrounds and electrically isolates the conductive core;
      a first magnetically permeable material disposed on the conductive core; and
      a second magnetically permeable material disposed on the conductive core, the second magnetically permeable material electrically isolated from the first magnetically permeable material by the insulating layer.

2. The electronic device as recited in claim 1, further comprising:
   a housing, wherein the battery and the inductive charging coil are disposed in the housing; and
   a display assembly coupled with the housing.

3. The electronic device as recited in claim 2, wherein the housing comprises a non-metal portion, and the inductive charging coil is configured to receive an induced current through the non-metal portion.

4. The electronic device as recited in claim 1, wherein the first magnetically permeable material limits an eddy current induced in a peripheral region of the conductive core to a first induced eddy current.

5. The electronic device as recited in claim 4, wherein the first induced eddy current is less than a second induced eddy current that is capable of being generated in the peripheral region of the conductive core in accordance with an exposed surface of the conductive core, the exposed surface being free of the first magnetically permeable material.

6. The electronic device as recited in claim 5, wherein the first induced eddy current corresponds to a first electrical resistance and wherein the second induced eddy current corresponds to a second electrical resistance that is greater than the first electrical resistance.

7. The electronic device as recited in claim 6, wherein the first electrical resistance corresponds to a first Q factor that is greater than a second Q factor corresponding to the second electrical resistance.

8. The electronic device as recited in claim 1, wherein the first magnetically permeable material comprises a disjoint pattern that is characterized as portions of the plated first magnetically permeable material being isolated from each other.

9. The electronic device as recited in claim 1, wherein the first magnetically permeable material has a thickness of about 1-1.5 microns.

10. A portable electronic device, comprising;
    a battery; and
    an inductive charging unit capable of providing power to the battery, wherein the inductive charging unit comprising:
       an inductive coil that is formed of a wire arranged in a spiral pattern having a first end electrically coupled to a ground and a second end electrically coupled to the battery, wherein the wire includes a conductive core;
       an insulating layer that electrically isolates the conductive core; and
       a magnetically permeable material that is plated on the conductive core at an exposed surface of the conductive core, the exposed surface defined by the insulating layer, wherein an interaction with an external magnetic field generates a first eddy current in the conductive core at the insulation layer and a second eddy current in the conductive core at the magnetically permeable material, the second eddy current having a magnitude less than that of the first eddy current.

11. The portable electronic device as recited in claim 10, wherein the magnetically permeable material is capable of limiting an eddy current induced by a magnetic field from an adjacent portion of the wire.

12. The portable electronic device as recited in claim 10, wherein the spiral pattern comprises a disjoint pattern that is characterized as portions of the plated magnetically permeable material being isolated from each other.

13. The portable electronic device as recited in claim 10, wherein the inductive charging unit has a first Q factor that is greater than a second Q factor corresponding to an absence of the magnetically permeable material.

14. The portable electronic device as recited in claim 10, wherein the magnetically permeable material includes a metal.

15. The portable electronic device as recited in claim 14, wherein the metal comprises a nickel/iron alloy.

16. A method of forming an inductive charging unit having a wire having a conductive core capable of carrying an electrical current, the method comprising:
    surrounding the conductive core by an insulating layer that electrically isolates the conductive core;

exposing at least a portion of an exterior surface of the conductive core, the exterior surfacing defining an exposed portion that lacks the insulating layer; and plating a magnetically permeably material on the exposed portion of the conductive core.

17. The method as recited in claim 16, wherein the conductive core comprises a disjoint pattern that is characterized as portions of the magnetically permeable material being isolated from each other.

18. The method as recited in claim 16, wherein the conductive core comprises a spiral pattern.

19. The method as recited in claim 16, wherein the magnetically permeable material includes a metal.

20. The method as recited in claim 19, wherein the metal includes any of iron or a nickel/iron alloy.

* * * * *